US006845402B1

(12) United States Patent
Dwork

(10) Patent No.: US 6,845,402 B1
(45) Date of Patent: Jan. 18, 2005

(54) DESCRIPTOR BURST READ-AHEAD

(75) Inventor: Jeffrey Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/481,686

(22) Filed: Jan. 12, 2000

Related U.S. Application Data

(60) Provisional application No. 60/169,270, filed on Dec. 7, 1999.

(51) Int. Cl.[7] .......................... G06F 15/14; G06F 13/00
(52) U.S. Cl. .......................... 709/250; 709/234; 710/35
(58) Field of Search .............................. 709/250, 234; 710/105, 35

(56) References Cited

U.S. PATENT DOCUMENTS

| | | | | |
|---|---|---|---|---|
| 5,751,951 A | * | 5/1998 | Osborne et al. | ............ 709/250 |
| 5,870,627 A | * | 2/1999 | O'Toole et al. | ............... 710/22 |
| 5,941,952 A | * | 8/1999 | Thomas et al. | ............. 709/234 |
| 6,256,693 B1 | * | 7/2001 | Platko | ......................... 710/105 |
| 6,334,162 B1 | * | 12/2001 | Garrett et al. | ................ 710/54 |
| 6,345,345 B1 | * | 2/2002 | Yu et al. | ...................... 711/151 |

* cited by examiner

Primary Examiner—Frantz B. Jean

(57) ABSTRACT

A novel method of reading descriptors by a network interface is provided in a computer system having a host CPU and a memory containing descriptors arranged in a list. The method includes reading at least two descriptors in a single PCI bus transaction. The network interface comprises a PCI interface for providing connection to the system via a PCI bus, and descriptor management logic for reading descriptors from the memory via the PCI interface. The descriptor management logic is configured for reading more than one descriptor in a single PCI read transaction. After reading a first descriptor, the descriptor management logic reads a second descriptor following the first descriptor regardless of whether the second descriptor is owned by the network interface or the host CPU. The network interface performs a read operation to read a message buffer associated with the second descriptor if this descriptor is owned by the network interface. However, no reading of this message buffer is performed if the second descriptor is owned by the host CPU.

13 Claims, 2 Drawing Sheets

DESCRIPTOR BURST READ-AHEAD

RELATED APPLICATIONS

This application claims priority from U.S. Provisional Patent Application Ser. No. 60/169,270, filed Dec. 7, 1999, which is incorporated herein by reference.

FIELD OF THE INVENTION

The present invention relates to data communications, and more particularly, to a network controller capable of performing burst reads of descriptors.

BACKGROUND ART

In a computer system including a CPU, a memory sub-system and a network controller, a PCI bus may be provided to support communications of the network controller with the CPU and the memory. When a process running on such a system sends a message over the network, it is necessary for the CPU to convey to the network the existence of the message and its content. To perform this task in an efficient way, instead of placing the required information into registers of the network controller, the CPU stores it in the memory sub-system. The network controller accesses this information using PCI bus master operations.

In order to minimize the number of access operations, the information should reside in structures of the memory sub-system having fixed addresses. Because the message may be quite large, its data is not stored in such structures. Instead the structures contain such information as the start address and length of the actual data regions. Each element in such a structure is referred to as a "descriptor".

There are several different ways of organizing descriptors. For example, descriptors may be arranged in a linear list having a fixed beginning and a fixed or variable length. A variation of the linear list is a descriptor ring, in which the first descriptor logically follows the last. The ring includes a suitable semaphore system that allows both the network controller and the CPU to determine at any particular time whether the contents of any particular descriptor are valid and whether it is allowed to alter to contents of that descriptor.

Frames sent on a network are often comprised of data from several sources. They typically contain some network header information followed by headers from one or more higher level protocols inserted before the data. It is most efficient for the network controller to gather these headers and data from buffers in separate regions of the memory sub-system, rather than require the CPU to copy everything to a single, contiguous buffer in the memory sub-system. Thus, a single frame requires storing many buffer addresses and lengths.

To convey this information to the network controller, one descriptor may be provided to define each buffer in the memory sub-system. The network controller has a mechanism to determine which descriptor is the first descriptor of a frame, and which is the last.

When the network controller is informed of the existence of a frame to transmit, the network controller must read the first descriptor associated with the frame, examine it for correctness and read the data associated with that descriptor. This descriptor read is performed by the network controller acting as a PCI bus master.

When a device requests the PCI bus, there is some delay before the request is granted and the bus becomes available. After the memory read command is issued, there is a further delay before the memory sub-system returns the first double word of data. Such delays reduce the speed of transmission and increase the PCI bus bandwidth required for the network controller.

Accordingly, it would be desirable to create a descriptor read mechanism that allows PCI bus delays to be reduced.

DISCLOSURE OF THE INVENTION

The present invention offers a novel method of reading descriptors by a network interface in a computer system having a host CPU and a memory containing descriptors arranged in a list. The method includes reading at least first and second descriptors in a single PCI bus transaction.

In accordance with one aspect of the present invention, the network interface comprises a PCI interface for providing connection to the system via a PCI bus, and descriptor management logic for reading descriptors from the memory via the PCI interface. The descriptor management logic is configured for reading more than one descriptor in a single PCI read transaction.

In particular, after reading a first descriptor, the descriptor management logic reads a second descriptor following the first descriptor regardless of whether the second descriptor is owned by the network interface or the host CPU. The network interface performs a read operation to read a message buffer associated with the second descriptor if the second descriptor is owned by the network interface. However, no reading of this message buffer is performed if the second descriptor is owned by the host CPU. The network interface acts as a PCI bus master when the descriptors are read from the system memory.

In a preferred embodiment of the invention, the descriptor management logic performs a single PCI burst read transaction to read multiple transmit descriptors when transmit data are transferred from the memory to the network interface. Similarly, multiple receive descriptors may be read in a single PCI burst read transaction when receive data are transferred from the network interface to the memory.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, such as an Ethernet (IEEE 802.3) network.

Figure 1:
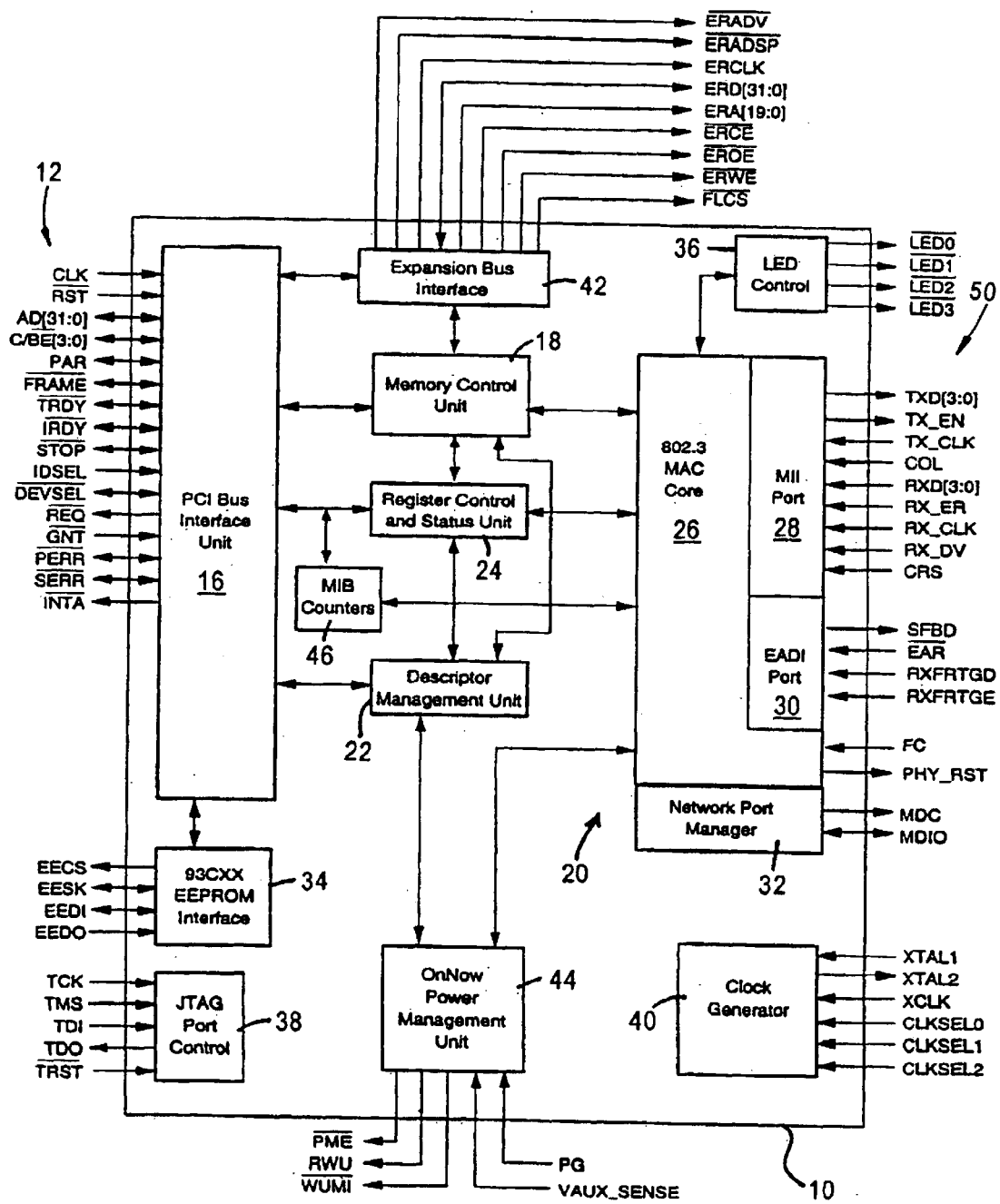
FIG. 1 is a block diagram of an exemplary network interface, in which the present invention may be implemented.

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10 Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a computer system memory, e.g. a host computer memory, via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the system memory via the PCI bus interface unit 16. Data structures contained in the system memory specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

Figure 2:
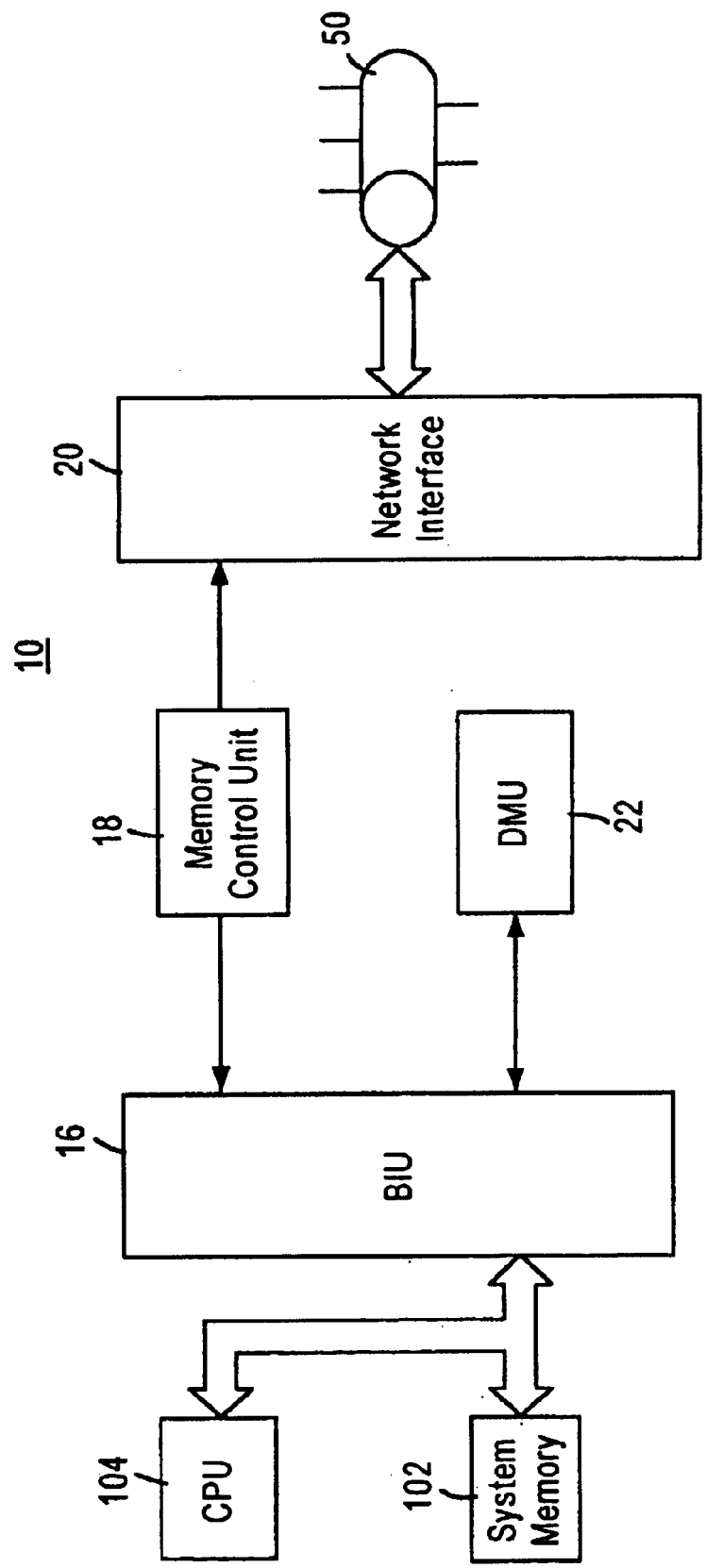
FIG. 2 is a block-diagram illustrating a descriptor reading scheme in the network interface.

Management of data transfers via the PCI bus 12 is performed using message descriptor entities organized as ring structures in the system memory. There are two descriptor rings, one for transmit operations and one for receive operations. As shown in FIG. 2, the descriptor management unit (DMU) 22 is provided in the network interface 10 for reading descriptors from the system memory 102. Each descriptor ring occupies a contiguous area of the system memory 102. The number of descriptors contained in each descriptor ring is set up during system initialization. Each descriptor describes a single buffer in the system memory 102. The host CPU 104 may place a frame of transmit data in more than one message buffer in the system memory. Also, more than one message buffer accessible by the host CPU 104 may be assigned for storing a frame of data received from the network.

As discussed above, transmit data are transferred from the message buffers in the system memory 102 via the PCI bus interface 16, the memory control unit 18, and the network interface 20 to the network 50. Receive data are passed via the network interface 20, the memory control unit 18, and the PCI bus interface 16 to the appropriate message buffers in the system memory 102.

Each descriptor in the descriptor ring contains the address of the corresponding message buffer in the system memory 102, the length of the message buffer, and status information indicating the condition of the message buffer. Transmit descriptors contain information on the message buffers that store transmit data. Receive descriptors have information on the message buffers to be used for storing receive data.

To enable access to message buffers by the host CPU 104 and the network interface 10, ownership of each message buffer is allocated to either the host CPU 104 or the network interface 10. Each descriptor contains the OWN bit in its status information field to indicate whether the host CPU 104 or the network interface 10 has ownership of a message buffer associated with that descriptor.

For example, when a descriptor has its OWN bit set to 1, it indicates that the network interface 10 currently has ownership of the descriptor and its associated message buffer. The network interface 10 sets the OWN bit to 0 to transfer ownership to the host CPU 104. Only the owner is permitted to relinquish the ownership or to write to any field of the descriptor. A device that is not the current owner of the descriptor cannot assume ownership or change any field in the descriptor. The host CPU 104 reads descriptors in sequential order. When it finds that the current descriptor is owned by the network interface 10, the host CPU 104 may wait until the network interface 10 releases the descriptor by setting the OWN bit to 0.

The network interface 10 acts as a PCI bus master to enable the DMU 22 to read a descriptor. When the system memory 102 has a frame to transmit on the network 50, the network interface 10 reads the first transmit descriptor associated with the frame, checks it for correctness and reads the message buffer associated with that descriptor. Then, the network interface 10 reads the second transmit descriptor for the frame and the message buffer associated with the second descriptor, etc. Similarly, when a frame is received from the network 50, the network interface 10 sequentially reads receive descriptors associated with the message buffers for storing data of the received frame in the system memory 102.

The descriptor management unit 22 is used to read descriptors from the system memory 102. Conventionally, the descriptor management unit 22 reads each descriptor in a separate PCI read transaction. Every PCI transaction has one PCI address phase, during which descriptor address information is transferred via the PCI bus, and one PCI data phase, during which descriptor data is transferred via the PCI bus. After reading the first descriptor for the frame, the descriptor management unit 22 checks the next descriptor to determine whether its OWN bit is set to 1. If the next descriptor is own by the network interface 10, the descriptor management unit 22 reads that descriptor in the next PCI read transaction.

In accordance with the present invention, the descriptor management unit 22 reads more than one descriptor in a single PCI burst read transaction, where one PCI address phase is followed by multiple PCI data phases. Thus, the descriptor management unit 22 reads multiple descriptors in a single PCI read transaction regardless of their ownership. Then, the OWN bits of the retrieved descriptors are checked to determine whether the network interface 10 owns the message buffers associated with the descriptors. If the OWN bits are set to 1 indicating that network interface 10 has ownership of the retrieved descriptors and their associated message buffers, the network interface 10 performs write or read transfers to or from the message buffers.

In particular, if the descriptor management unit 22 reads transmit descriptors from the transmit descriptor ring, the network interface 10 reads transmit data from the message buffers associated with the retrieved transmit descriptors. If the descriptor management unit 22 reads receive descriptors from the receive descriptor ring, the network interface 10 writes receive data to the message buffers associated with the retrieved receive descriptors.

However, if the second or any subsequent descriptor read in a PCI burst transaction is not owned by the network interface 10, write or read transfers to the associated message buffer is not performed.

Hence, at least two transmit or receive descriptors are read by the descriptor management unit 22 in a single PCI burst transaction. After reading a current descriptor, the descriptor management unit 22 performs a read-ahead operation to read the next descriptor in the same PCI read transaction regardless of the ownership of the next descriptor. As a result, the fraction of total PCI bus bandwidth used by the network interface 10 is reduced compared to the case, where a separate PCI transaction is required to read each descriptor. Also, the transmit and receive processes are accelerated, because less time is required to read data of a transmit frame from the corresponding message buffers or to write data of a receive frame to the corresponding message buffers.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. In a computer system having a host CPU and a memory, a network interface comprising:

a PCI interface for connecting the network interface to the system via a PCI bus, and descriptor management logic for reading descriptors from the memory via the PCI interface, the descriptor management logic reading more than one descriptor in a single PCI read transaction, wherein after reading a first descriptor by the descriptor management logic, a second descriptor following the first descriptor in the same PCI transaction is read by the descriptor management logic regardless of whether the second descriptor is owned by the network interface or the host CPU.

2. The network interface of claim 1, wherein the network interface performs a read operation to read a message buffer associated with the second descriptor if the second descriptor is owned by the network interface.

3. The network interface of claim 2, wherein the network interface performs no reading of the message buffer associated with the second descriptor if the second descriptor is owned by the host CPU.

4. The network interface of claim 1, wherein the descriptors are read in a PCI read transaction when the network interface acts as a PCI bus master.

5. The network interface of claim 1, wherein the descriptor management logic reads multiple transmit descriptors in a single PCI read transaction when transmit data are transferred from the memory to the network interface.

6. The network interface of claim 1, wherein the descriptor management logic reads multiple receive descriptors in a single PCI read transaction when receive data are transferred from the network interface to the memory.

7. In a computer system having a host CPU, a memory containing descriptors arranged in a list, and a network interface, a method of reading descriptors by the network interface comprising the steps of:

reading a first descriptor in a PCI bus transaction, and thereafter, reading a second descriptor following the first descriptor in the same PCI bus transaction as the first descriptor, wherein the second descriptor is read by the network interface regardless of whether the second descriptor is owned by the network interface or the host CPU.

8. The method of claim 7, wherein the network interface performs no reading of message buffer associated with the second descriptor if the second descriptor is owned by the host CPU.

9. The method of claim 7, further comprising the step of reading a third descriptor following the second descriptor in the same PCI bus transaction as the first and second descriptors.

10. The method of claim 9, wherein the third descriptor is read by the network interface regardless of whether the third descriptor is owned by the network interface or the host CPU.

11. The method of claim 10, wherein the network interface performs no reading of message buffer associated with the third descriptor if the third descriptor is owned by the host CPU.

12. The method of claim 7, wherein the first and second descriptors are transmit descriptors read by the network interface when transmit data are transferred from the memory to the network interface.

13. The method of claim 7, wherein the first and second descriptors are receive descriptors read by the network interface when receive data are transferred from the network interface to the memory.

* * * * *